March 23, 1954  R. E. BITZER ET AL  2,672,630
METHOD AND APPARATUS FOR SELECTIVE SORTING
Filed Nov. 21, 1946  3 Sheets-Sheet 1
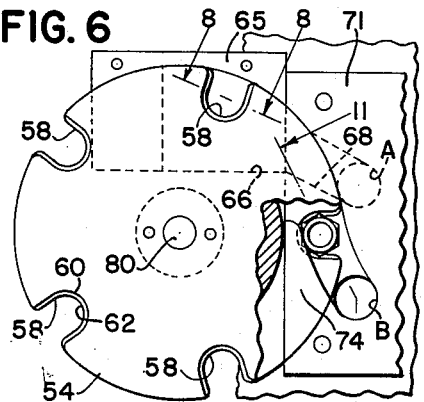
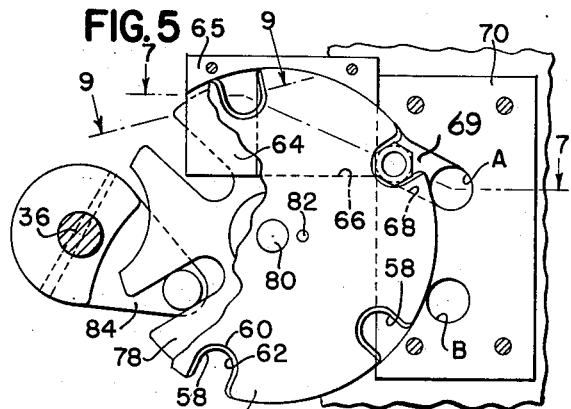
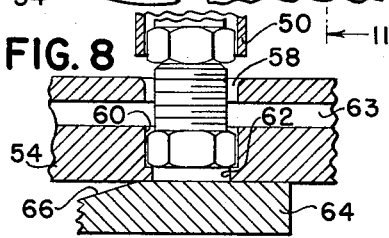
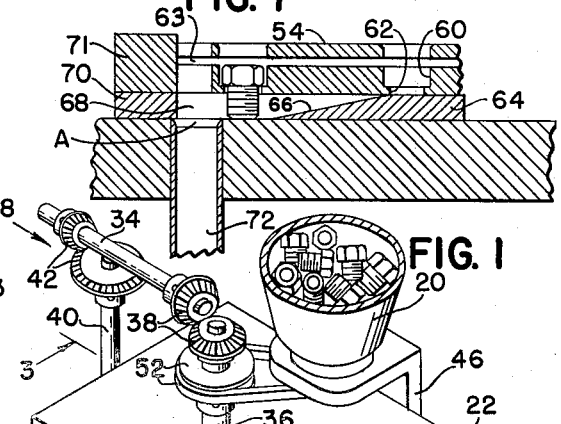
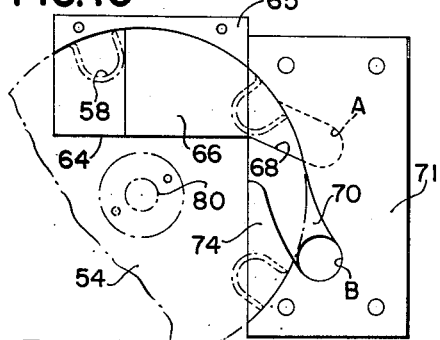
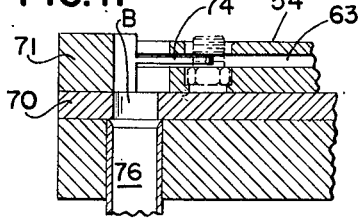
INVENTORS
ROBERT E. BITZER
WILSON E. MANOWN &
FRED W. LOY
BY
Toulmin & Toulmin
ATTORNEYS

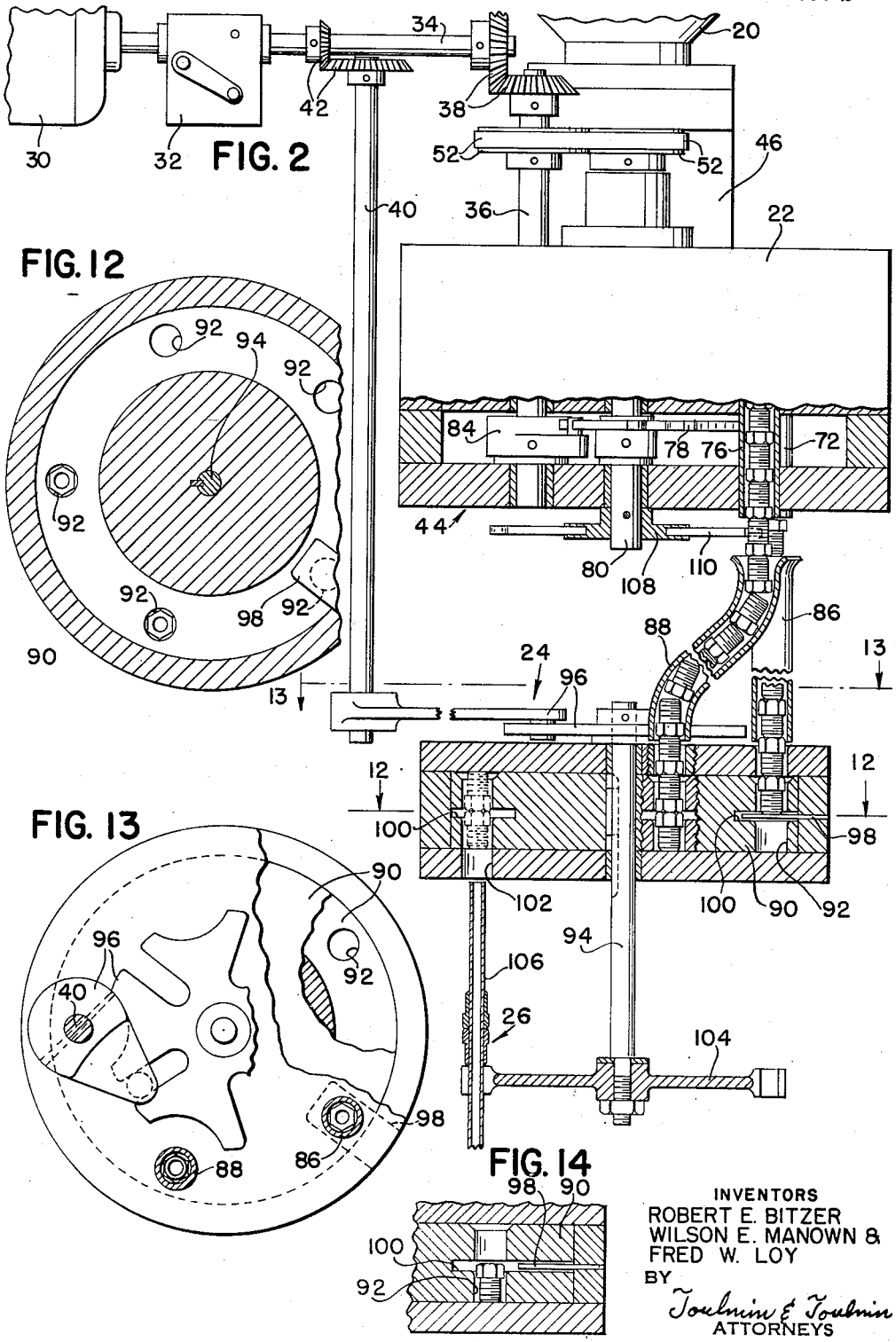
March 23, 1954 — R. E. BITZER ET AL — 2,672,630
METHOD AND APPARATUS FOR SELECTIVE SORTING
Filed Nov. 21, 1946 — 3 Sheets-Sheet 2
INVENTORS
ROBERT E. BITZER
WILSON E. MANOWN &
FRED W. LOY
BY
Toulmin & Toulmin
ATTORNEYS

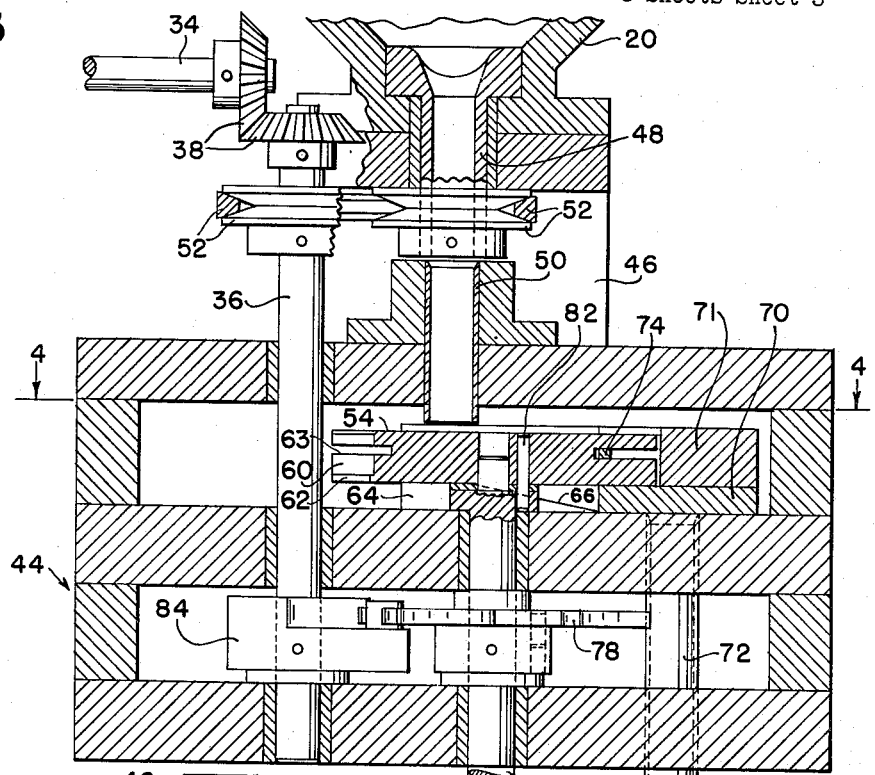
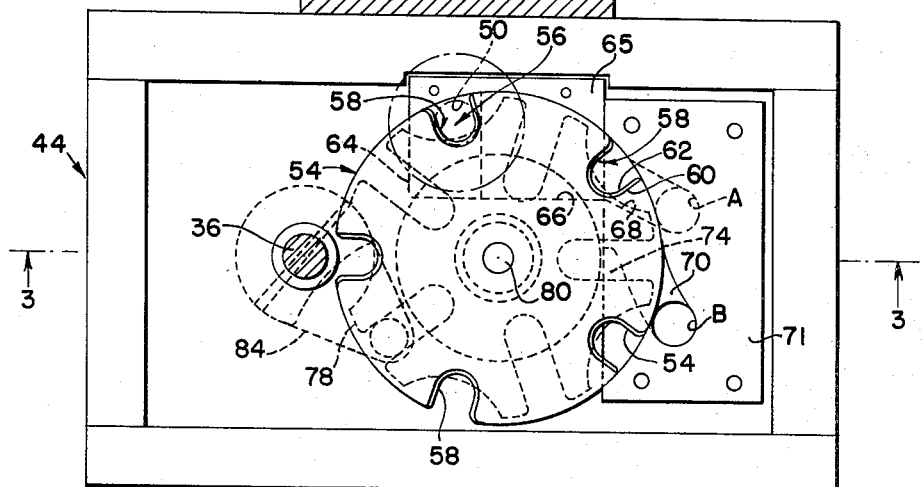

Patented Mar. 23, 1954

2,672,630

UNITED STATES PATENT OFFICE 2,672,630

METHOD AND APPARATUS FOR SELECTIVE SORTING

Robert E. Bitzer, Wilson E. Manown, and Fred W. Loy, Dayton, Ohio

Application November 21, 1946, Serial No. 711,346

8 Claims. (Cl. 10—162)

This invention relates to methods and apparatus for selectively sorting workpieces. This invention also relates to methods and apparatus for combined sorting and assembling operations.

In many work cycles it is necessary that the work members be selectively sorted either as to size, type, or as to the manner in which the work member is delivered, an example of the latter being a flare nut to be placed on tubing as illustrated in this application. Such work cycles ordinarily involve a manual sorting step which not only requires considerable labor but tends to slow down the work cycle appreciably. After the sorting, the assembly of the sorted work members together, or with another work member, must also, usually, be carried out manually.

It is the object of the present invention to provide an automatic mechanism for sorting work members according to a predetermined characteristic thereof.

A still further object is the provision of an automatic mechanism for sorting work members according to a certain characteristic thereof and the delivering of the sorted work members to predetermined work stations.

A still further object is the provision of a sorting mechanism according to this invention in combination with a distributing apparatus whereby selective assembly of workpieces is possible.

A still further object is the provision of an automatic apparatus for selective sorting and assembling of workpieces which always maintains an ample supply of the sorted workpieces ahead of the assembling station so that continuous operation of the apparatus results.

Another object of this invention is the provision of a method for continuously sorting workpieces according to predetermined characteristics thereof.

Another object is the provision of a method for continuously sorting and distributing workpieces in accordance with dimensional characteristics thereof.

These and other objects and advantages will become more apparent upon reference to the following description taken in connection with the accompanying drawings in which:

Figure 1 is a perspective view showing an apparatus according to this invention;

Figure 2 is a side view, partly in section, showing this invention;

Figure 3 is an enlarged sectional view showing the sorting portion of the device and is taken approximately on the lines 3—3 of Figures 1 and 4;

Figure 4 is a plan view over a portion of the sorting mechanism and is indicated by the line 4—4 on Figure 3;

Figure 5 is a view similar to Figure 4 but showing the device delivering a work member to one of the sorting stations;

Figure 6 is a similar view showing a work member being delivered to another of the sorting stations;

Figure 7 is a sectional view indicated by the line 7—7 on Figure 5 and showing a work member which is to be delivered to the first sorting station A;

Figure 8 is a section indicated by the line 8—8 on Figure 6 and shows a work member which is to be delivered to the second sorting station B;

Figure 9 is a section indicated by the line 9—9 on Figure 5 showing a work member which has just been received into the sorting wheel from the supply hopper;

Figure 10 is a plan view taken over the sorting stations and with the sorting wheel in phantom outline;

Figure 11 is a section on the line 11—11 of Figure 6 and showing the mechanism for delivering a work member into sorting station B;

Figure 12 is a plan view indicated by the line 12—12 on Figure 2 and shows the distributing wheel which receives the sorted work members from the sorting portion of the apparatus;

Figure 13 is a plan view taken substantially on the line 13—13 of Figure 2 and shows the drive mechanism for the distributing part of the apparatus; and Figure 14 is a view of the distributing wheel after one work member has been delivered thereto and before the second work member with which it is to be assembled has been received.

*General arrangement*

According to this invention workpieces are sorted according to certain dimensional characteristics thereof. In the illustrations shown in the drawings the workpieces being sorted are flare nuts which are to be assembled with tubing that is to be flared on each end. In assembling the nuts with the tubing it is necessary that the nuts be placed on the tubing with the threaded portions thereof toward the ends of the tubing. Thereafter, the tubing is flared and the unit is ready for assembly in a fluid circuit. The flare nuts shown in the drawing consist of a threaded portion at one end and a hexagonal nut portion at the other end and these portions are of different mean diameter.

In the sorting of the nuts they are introduced into a shouldered recess which will pass the threaded portion but retain the nut portion. Thus, if the nuts are delivered to the recesses with the threaded end down, they extend farther into the recesses than if they are delivered with the nut end down. By relatively moving the recesses containing the nuts and a pair of cams, the nuts can be selectively dislodged from the recesses into one or another sorting station according to the manner in which they lay in the recess.

It will be evident that the workpieces shown are not the only type adapted for being operated by a sorting device according to this invention, but that any workpieces having detectable characteristics of size and configuration are adapted for being sorted and thereafter being delivered to as many sorting stations as it is desired to have.

According to this invention after the nuts are sorted, they are distributed to an assembly station in such a manner that they may readily be assembled with a piece of tubing before at least one end thereof has been flared. It will be apparent that while the distributing station can be synchronized in operation with the sorting portion of the device, it is unnecessary for the two stations to be connected together and the distributing portion of the device can be separately actuated if desired.

According to the preferred form of this invention, the work members are placed in a hopper from which they fall through a tube to a wheel in the sorting device which comprises a plurality of notches opening inwardly from the periphery thereof. The notches are designed to support the work members in different positions depending upon the manner in which they fall into the said notches or upon the dimensional characteristics thereof. The wheel is rotated, either continuously or by a suitable intermittent mechanism such as a Geneva wheel, and carries the workpieces in the said recesses past sorting stations, each of which has a cam adapted for engagement with the workpiece in one of its positions in the said recesses and to dislodge the workpiece from the recess and deliver it to the sorting station.

The sorting stations comprise tubes which deliver the workpieces to a distributing station which also, preferably, comprises a rotating wheel. The distributing wheel comprises a plurality of stations each of which is of a size to receive a plurality of workpieces. The workpieces are delivered from the tubes leading from the sorting stations into the stations in the distributing wheel in succession and emerge, or are removed from the distributing wheel at an assembly station.

Optionally, the workpieces may be removed individually from the sorting stations depending upon the nature of the assembly work to be done.

Structural arrangement

Referring to the drawings more in detail, Figure 1 is a perspective view of a device according to this invention and it will be seen to comprise a hopper 20 which is disposed over a sorting station 22. Beneath the sorting station 22 is a distributing station 24 which may deliver the sorted and distributed work members to an assembly station as at 26. The mechanism of the sorting and distributing apparatus is driven by a geared drive generally indicated at 28 in Figure 1.

The entire unit is shown in Figure 2, partly in section, wherein it will be seen that the drive comprises a motor 30 which may drive through a speed change unit at 32 into a shaft 34. The shaft 34 is geared to the shaft 36 of the sorting unit 22 as by the bevel gears 38 and to the shaft 40 of the distributing unit 24 as by the bevel gears 42. As will become more apparent hereinafter, the shaft 40 is driven at one-half the speed of the shaft 36 but this particular ratio may be varied according to varying work cycles.

Sorting station

The sorting station 22 and the mechanism by which the workpieces are delivered from the hopper 20 thereto is best shown in Figures 2 through 11. The sorting station consists of a frame 44 which carries, as by the bracket 46, the hopper 20. The hopper 20 communicates with the interior of the frame 44 via a tube 48 opening from the bottom of the hopper and the tube 50 in alignment therewith which is carried on the top plate of the frame 44. Preferably, the tube 48 is driven in rotation by the belt and pulley arrangement 52 in order to promote the feeding of the workpieces therethrough. The workpieces which pass through the tubes 48 and 50 to the interior of the casing 44 are delivered to the periphery of the sorting wheel 54 at the position indicated at 56 in Figure 4.

The sorting wheel 54 comprises a plurality of recesses 58 around the periphery thereof which have a larger upper portion 60 and a smaller lower portion 62. The wheel is also peripherally slotted as at 63 with a slot passing substantially through the center of the larger portion 60 of the recesses 58.

In Figures 8 and 9 the recess 58 at the receiving station 56 is illustrated with workpieces delivered thereto from the tube 50 and with the said workpieces, one in one position, and the other in the inverted position. It will be noted that in Figure 8 the workpiece, which is a flare nut, is resting in the recess on the ledge between the portions 60 and 62 thereof with the threaded end of the nut extending upwardly; whereas, in Figure 9, the nut end of the flare nut is upwardly and the threaded end is extending through the portion 62 of the recess.

Directly beneath the station 56 is a plate 64 which has a flat portion directly beneath the said station and an inclined portion 66 extending downwardly toward the first receiving station A. The purpose of the plate 64 is for supporting the workpieces which fall into the wheel in the position shown in Figure 9. It will be noted that the workpiece in Figure 9 is supported so that the upper end thereof is substantially flush with the top surface of the wheel 54. Thus, when the wheel turns to carry the workpiece out of the station 56, the workpiece directly thereabove in the tube 50 will not stagger on the edge of the recess 58. It will be noted that there is provided a block 65 which abuts the periphery of the wheel 54 adjacent the receiving station 56 and which confines the workpieces to the recesses within which they fall so that they are not thrown therefrom by centrifugal force as the wheel turns.

As the wheel 54 turns clockwise, as viewed in Figure 4, the workpieces which are in the recesses in the position shown in Figure 9 slide down the incline 66 into the position shown in Figure 7. It will be noted that in this position the peripheral slot 63 of the wheel is above the nut portion of the workpiece.

Referring to Figures 4, 5, 7 and 9, there is illustrated the steps leading to the delivery of a workpiece to the first receiving station and sorting device which is indicated at A. The first sorting station is adapted for receiving the work members which are received in the recesses as indicated in Figure 9 and, as the wheel rotates clockwise, the workpieces move from their Figure 9 position to the position indicated in Figures 5 and 7 due to the fact that the threaded ends thereof pass through the portions 62 of the recesses 58.

With the workpieces in this position they are engaged by a cam surface 68 on a block 70, this block extending beneath the wheel 54, as best seen in Figure 3. Further rotation of the wheel 54 from its Figure 5 position will cause the nut which is engaged by the cam 68, formed by one side of the slat 69, to be withdrawn from the periphery of the wheel and to drop into the receiving tube 72 of the receiving station A. It will be noted that there is a block 71 which overlies the block 70 and which abuts the periphery of the wheel 54 in the same manner as the block 65 thereby retaining the workpieces in the recesses in the periphery of the wheel.

It will be noted that workpieces which are received in the recesses as indicated in Figure 8 will pass the receiving station A. The workpieces which are delivered to the recesses 56 as shown in Figure 8 will be received in the second receiving station which is indicated at B and the manner of accomplishing this is best seen in Figures 8, 10 and 11.

After the wheel has turned to carry a nut beyond the station A, as the station B is approached, a cam tongue 74 which is carried by the block 71 and which extends into the peripheral slot 63 engages the nut as shown in Figure 6. Further rotation of the wheel beyond its Figure 6 position will cause the nut to be withdrawn from the recess and to be dropped into the receiving tube 76 of the receiving station B.

It will be noted that the continuous supply of workpieces through the tubes 48 and 50 insures that there will be a nut deposited in each of the recesses 58 as they pass the delivery station 56 and that, therefore, each index of the wheel 54 will result in the delivery of a nut to the sorting device to be delivered on one of the two indexes following to one of the sorting stations.

The wheel 54 may be continuously driven, but in the drawings there is shown a Geneva wheel 78 which is connected with a shaft 80 doweled or otherwise suitably keyed to the wheel 54 as at 82. The Geneva wheel 78 is adapted for being driven by the Geneva arm 84 which is pinned to the shaft 36.

From the foregoing it will be apparent that there will be a continuous supply of sorted workpieces from the hopper 20 to the two delivery tubes 72 and 76. Also, it will be obvious that the sorting mechanism of this invention is not necessarily limited to the delivery of workpieces to two stations, but may be employed for delivering work members to as many stations as there are critical dimensions on the work member by which it may be gauged.

*Distributing station*

According to the arrangement of this invention, the delivery tubes 72 and 76 of the sorting stations A and B, respectively, open over a pair of receiving tubes 86 and 88, respectively, which lead to the distributing device indicated at 24. It is best seen in Figures 2, 12, 13 and 14, that the distributing device comprises a wheel 90 having a plurality of bores 92 therein each of which is of a length to receive two of the flare nuts. The wheel 90 is keyed to a shaft 94 which is adapted for actuation by the Geneva mechanism indicated at 96 which is similar to the Geneva mechanism which actuates the wheel of the sorting device.

The Geneva mechanism 96 is actuated by the shaft 40 which is driven by the shaft 34 and, as pointed out before, operates at one-half the speed of the wheel 54, this being necessary because the wheel 54 delivers one nut on each index while the distributing station delivers a pair of nuts on each index.

As seen in Figure 13, the tubes 86 and 88 communicate with the wheel 90 at consecutive stations and at the station in alignment with the tube 86 there is a blade 98 which extends into the peripheral groove 100 in the wheel 90. The blade 98 is so positioned that the axial distance from the said blade to the top of the wheel 90 is substantially equal to the length of one of the flare nuts. Thus, when the wheel 90 indexes it will carry one nut away from the station in alignment with the tube 86.

As soon as the wheel 90 indexes away from its Figure 2 position, the flare nut resting on the blade 98 is dropped to the bottom of the bore 92 so that when the said bore moves into alignment with the tube 88, one of the nuts therein will drop into the bore. By selecting the axial thickness of the wheel 90 to be substantially equal to the axial length of a pair of nuts, when the wheel 90 is indexed again it will carry one nut away from the tube 88.

Thereafter, the next station with which the bore 92 moves into alignment preferably opens through an aperture 102 so that the paired nuts can be delivered to the assembly station. As shown in the drawings, the assembly station may comprise a bracket means 104 which carries lengths of tubing as at 106 and onto which the paired nuts fall when the bore 92 is in alignment with the aperture 102.

It will be apparent that the particular arrangement of distributing and assembling devices shown is only exemplary and that many other arrangements could be arrived at by anyone skilled in the art as, for example, the arrangement of the wheel 90 to rotate on a horizontal axis whereupon the work members in the bores 90 may be removed by means other than gravity. It will also be evident that it is unnecessary to drive the distributing and the assembling station together with the sorting apparatus but that these may be separately actuated in accordance with individual preference and the particular work cycle.

Preferably, the sorting device is operated in a manner to insure an over-supply of workpieces to the distributing and assembling device and to this end, the tubes 72 and 76 are spaced from the tubes 86 and 88 by a distance at least equal to the axial length of the work members being passed therethrough. The shaft 80 is provided with a hub 108 that carries the spring fingers 110 which pass through the spaces between the said tubes. Thus, when the tubes 86 and 88 are filled and there is an excess delivery of workpieces thereto, these are kicked out by the springs 110 and may be returned to the hopper 20 for resorting.

This arrangement insures an adequate supply of workpieces to the distributing and assembling device without the possibility of the sorting device becoming jammed at any time.

It will be understood that this invention is susceptible to modification in order to adopt it to different usages and conditions and, accordingly, it is desired to comprehend such modifications within this invention as may fall within the scope of the appended claims.

We claim:

1. In an apparatus for sorting workpieces of substantially uniform size and shape and having a larger end and a smaller end; a movable member having a plurality of shouldered recesses extending inwardly from the edge thereof adapted for supporting the workpieces at an upper or a lower level depending on whether the workpiece is delivered with the large end or the small end lowermost; a supply station adapted for receiving a quantity of the workpieces and for delivering them individually to said recesses at a delivery station; a pair of cams spaced from each other and from said delivery station and each adapted to dislodge workpieces from the recesses in a different of their positions therein; a receiving station adjacent each cam adapted to receive the workpieces dislodged from the recesses thereby and to retain the workpieces properly oriented; and distributing means adapted for receiving the workpieces singly from said receiving stations in succession and for delivering the workpieces so received in oppositely oriented pairs to a work station.

2. In a device for selectively sorting workpieces having a large end, a small end and a longitudinal axis; a movable member having a plurality of shouldered recesses opening inwardly from one edge and adapted for supporting the workpieces to be supported at an upper or a lower level depending on whether the large or small end of the workpiece is lowermost; a supply station adapted to deliver workpieces in an axial direction to said recesses; a pair of cams spaced from each other and from said supply station overlapping the path of said recesses and each adapted to engage workpieces in one of the positions thereof in said recesses and to dislodge the workpieces so engaged from said recesses; means of driving said member to successively index said recesses into alignment with said supply station; means to agitate the workpieces at said supply station to promote the feeding thereof to said recesses; and means for automatically collecting the dislodged workpieces in oppositely oriented pairs and discharging them in such paired relation to a work station.

3. In a device for selectively sorting workpieces having a large end and a small end; a movable member having a plurality of shouldered recesses opening inwardly from one edge and adapted for supporting the workpieces to be supported at an upper or a lower level depending on whether the large or small end of the workpiece is lowermost; a supply station adapted to deliver workpieces in an axial direction to said recesses; a pair of cams spaced from each other and from said supply station overlapping the path of said recesses and each adapted to engage workpieces in one of the positions thereof in said recesses and to dislodge the workpieces so engaged from said recesses; a pair of receiving channels adapted for receiving the dislodged workpieces and for retaining the same in the proper orientation; and distributing means comprising a member movable to receive a sorted workpiece from each of said receiving channels in succession and to deliver the two workpieces so received to a work station.

4. In a device for selectively sorting workpieces having a large end and a small end; a movable member having a plurality of shouldered recesses opening inwardly from one edge and adapted for supporting the workpieces to be supported at an upper or a lower level depending on whether the large or small end of the workpiece is lowermost; a supply station adapted to deliver workpieces in an axial direction to said recesses; a pair of cams spaced from each other and from said supply station overlapping the path of said recesses and each adapted to engage workpieces in one of the positions thereof in said recesses and to dislodge the workpieces so engaged from said recesses; a pair of receiving channels each adapted for receiving the workpieces dislodged by a different one of said cams and for retaining the workpieces in the same orientation they have at the time of the said dislodging; a distributing station adapted for receiving the sorted workpieces and comprising a member having apertures therein and adapted to be indexed to move said apertures into alignment with said receiving stations in succession; and means operable to permit only one workpiece from each station to be received in said apertures, whereby each aperture receives two oppositely oriented workpieces.

5. In a device for selectively sorting workpieces having a large end and a small end; a movable member having a plurality of shouldered recesses opening inwardly from one edge and adapted for supporting the workpieces to be supported at an upper or a lower level depending on whether the large or small end of the workpiece is lowermost; a supply station adapted to deliver workpieces in an axial direction to said recesses; a pair of cams spaced from each other and from said supply station overlapping the path of said recesses and each adapted to engage workpieces in one of the positions thereof in said recesses and to dislodge the workpieces so engaged from said recesses; a pair of receiving channels adapted for receiving the dislodged workpieces and for retaining the same in the same orientation they have at the time of the said dislodging; a distributing station adapted for receiving the sorted workpieces and comprising a member having apertures therein and adapted to be indexed to move said apertures into alignment with said receiving stations in succession; means operable to permit only one workpiece from each station to be received in said apertures, whereby each aperture receives two oppositely oriented workpieces; and a work station into which the distributing member discharges the two workpieces collected thereby in each aperture.

6. In a device for selectively sorting workpieces having a large end and a small end; a movable member having a plurality of shouldered recesses opening inwardly from one edge and adapted for supporting the workpieces to be supported at an upper or a lower level depending on whether the large or small end of the workpiece is lowermost; a supply station adapted to deliver workpieces in an axial direction to said recesses; a pair of cams spaced from each other and from said supply station overlapping the path of said recesses and each adapted to engage workpieces in one of the positions thereof in said recesses and to dislodge the workpieces so engaged from said recesses; a pair of receiving channels adapted for receiving the dislodged workpieces and for retaining the same in the same orientation they have at the time of the said dislodging; a distributing station adapted for receiving the sorted workpieces and comprising a member having apertures therein and adapted to be indexed to move said apertures into alignment with said receiving stations in succession; means operable to permit only one workpiece from each station to be received in said apertures, whereby each aperture receives two oppositely oriented workpieces; and a common driving means for the movable members of the sorting and distributing devices whereby the operation thereof is synchronized.

7. In a device for selectively sorting workpieces having a large end and a small end; a movable member having a plurality of shouldered recesses opening inwardly from one edge and adapted for supporting the workpieces to be supported at an upper or a lower level depending on whether the large or small end of the workpiece is lowermost; a supply station adapted to deliver workpieces in an axial direction to said recesses; a pair of cams spaced from each other and from said supply station overlapping the path of said recesses and each adapted to engage workpieces in one of the positions thereof in said recesses and to dislodge the workpieces so engaged from said recesses; a pair of receiving channels adapted for receiving the dislodged workpieces and for retaining the same in the same orientation they have at the time of the said dislodging; a distributing station adapted for receiving the sorted workpieces and comprising a member having apertures therein and adapted to be indexed to move said apertures into alignment with said receiving stations in succession; means operable to permit only one workpiece from each station to be received in said apertures, whereby each aperture receives two oppositely oriented workpieces; a common driving means for the movable members of the sorting and distributing devices whereby the operation thereof is synchronized; and means for ejecting workpieces delivered from said receiving stations to the distributing member in excess of that required of said distributing member.

8. In a sorting mechanism for workpieces having a large end and a small end; a supply hopper; a feed chute opening from the bottom of said hopper to deliver the workpieces axially; a selector wheel having a plurality of shouldered recesses extending inwardly from the periphery thereof and adapted for supporting the workpieces in an upper or lower level depending on whether the larger or smaller end is lowermost; means rotatably supporting said wheel so that the recesses pass beneath said feed chute; a plate beneath said wheel in alignment with said chute to support the workpieces delivered to the recesses so the upper ends of the workpieces are at least as high as the top of the wheel until the said recesses are moved out of alignment with said chute; a first cam adapted to engage and dislodge the workpieces from the recesses when supported therein in one position; a second cam adapted for engaging and dislodging the workpieces from the recesses which lie in the opposite direction therein; a pair of receiving tubes, one for receiving the workpieces dislodged by each cam and for supporting the workpieces in the same orientation as when they were dislodged; a distributing wheel having a plurality of axial bores therein adapted to register successively with said tubes; means associated with said delivery wheel for permitting only one workpiece to be delivered to said axial bores therein from each tube, whereby each aperture receives two oppositely oriented workpieces; and drive means for said sorting and distributing wheels comprising Geneva mechanisms for indexing said wheels intermittently.

ROBERT E. BITZER.
WILSON E. MANOWN.
FRED W. LOY.

References Cited in the file of this patent

UNITED STATES PATENTS

| Number | Name | Date |
| --- | --- | --- |
| 1,341,278 | Morey | May 25, 1920 |
| 1,411,169 | Ehrman | Mar. 28, 1922 |
| 1,456,216 | Brightman | May 22, 1923 |
| 1,735,609 | Frederich | Nov. 12, 1929 |
| 1,739,422 | Schmidt | Dec. 10, 1929 |
| 1,873,377 | Frayer | Aug. 23, 1932 |
| 2,278,599 | Veit | Apr. 7, 1942 |
| 2,327,126 | Raetsch | Aug. 17, 1943 |
| 2,333,940 | Kuehlman | Nov. 9, 1943 |